(12) United States Patent
Hubbard

(10) Patent No.: US 7,955,217 B2
(45) Date of Patent: Jun. 7, 2011

(54) POWER TRAIN CONTROL SYSTEM

(75) Inventor: Milton Carter Hubbard, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 786 days.

(21) Appl. No.: 11/987,514

(22) Filed: Nov. 30, 2007

(65) Prior Publication Data

US 2009/0143191 A1    Jun. 4, 2009

(51) Int. Cl.
*B60W 10/04* (2006.01)
*B60W 10/10* (2006.01)

(52) U.S. Cl. ...................................................... 477/115
(58) Field of Classification Search .................. 477/115
See application file for complete search history.

(56) References Cited

U.S. PATENT DOCUMENTS

| | | | |
|---|---|---|---|
| 3,225,617 A * | 12/1965 | Young | 477/43 |
| 4,161,894 A * | 7/1979 | Giacosa | 477/48 |
| 4,353,272 A | 10/1982 | Schneider et al. | |
| 4,543,077 A | 9/1985 | Yamamuro et al. | |
| 4,543,855 A * | 10/1985 | Oetting et al. | 477/43 |
| 4,658,360 A | 4/1987 | Osanai et al. | |
| 4,683,779 A | 8/1987 | Osanai et al. | |
| 5,355,749 A | 10/1994 | Obara et al. | |
| 5,382,205 A | 1/1995 | Togai et al. | |
| 5,431,602 A | 7/1995 | Hendriks et al. | |
| 5,871,417 A | 2/1999 | Suzuki | |
| 6,066,070 A | 5/2000 | Ito et al. | |
| 6,324,456 B2 | 11/2001 | Bosse | |
| 6,480,775 B2 | 11/2002 | Cho | |
| 6,726,594 B2 | 4/2004 | Mizuno et al. | |

FOREIGN PATENT DOCUMENTS

JP    2000289496 A    10/2000

\* cited by examiner

*Primary Examiner* — Sherry Estremsky
(74) *Attorney, Agent, or Firm* — Finnegan, Henderson, Farabow, Garrett & Dunner LLP

(57) ABSTRACT

A power train is provided having a power source operably coupled to a transmission to transmit a power output to at least one traction device. The power train also has a controller configured to regulate the power output so that the power output generated when the at least one traction device is moving at a maximum speed is the maximum power output that the power source and the transmission are capable of producing.

15 Claims, 5 Drawing Sheets

POWER TRAIN CONTROL SYSTEM

TECHNICAL FIELD

The present disclosure is directed to a control system, and more particularly, to a control system for a power train.

BACKGROUND

Machines such as, for example, wheel loaders, dozers, backhoes, dump trucks, and other heavy equipment are used to perform many tasks. To effectively perform these tasks, the machines require an engine that provides significant torque through a transmission to one or more ground engaging devices. Such engines typically produce a maximum power output at a single engine speed. Often, for increased engine efficiency, these machines utilize automatic type transmissions such as, for example, continuously variable transmissions (CVT) that provide an infinite number of output ratios within their ratio ranges.

An existing control strategy, typically employed by existing CVT control systems in response to a vehicular acceleration request, maintains an associated engine at the speed producing the maximum power output for that engine while increasing the transmission ratio. As the vehicle's speed increases, the engine speed is kept constant until the transmission ratio reaches a maximum. If the vehicle's maximum speed has not been reached at this point, the existing control strategy increases the engine speed.

Another CVT control strategy employed in response to a vehicular acceleration is disclosed in U.S. Pat. No. 6,066,070 (the '070 patent) issued to Ito et al. on May 23, 2000. The control system disclosed in the '070 patent references an acceleration map when receiving an acceleration request. Based on the map, the control system increases engine speed in proportion to the increase in vehicular speed. At the same time, the transmission ratio of the CVT is manipulated to generate a desired torque output. The control system continues the acceleration event until either the acceleration request has been terminated or the maximum engine speed and transmission ratio have been reached. In addition, the engine speed utilized at the end of the acceleration event is maintained until either another acceleration request is received or a deceleration request is received.

Although the control strategy disclosed in '070 patent and the other existing CVT control strategies may adequately operate a power system at lower vehicular speeds, such control strategies may produce sluggish performances at higher vehicular speeds. In particular, because the engine speed varies, it is no longer set to the speed that produces the maximum engine power. Therefore, the power output of the transmission is reduced. If the vehicle meets increased external resistance such as a hill, the transmission may not be able to maintain the maximum speed. In addition, as the vehicular speed increases, rolling resistance and internal friction experienced in the wheel and axle increase and may act against the transmission's power output.

The disclosed system is directed to overcoming one or more of the problems set forth above.

SUMMARY

In one aspect, the present disclosure is directed toward a power train. The power train includes a power source operably coupled to a transmission to transmit a power output to at least one traction device. The power train also includes a controller configured to regulate the power output so that the power output generated when the at least one traction device is moving at a maximum speed is the maximum power output that the power source and the transmission are capable of producing.

Consistent with another aspect of the disclosure, a method is provided for operating a power train. The method includes sensing a first parameter indicative of a power source speed and sensing a second parameter indicative of an operating condition of a transmission. The method also includes sensing a third parameter indicative of a speed of an associated machine. The method further includes regulating a power output of a power source and the transmission so that the power output generated when the machine is moving at a maximum speed is the maximum power that the power source and the transmission are capable of producing.

DETAILED DESCRIPTION

Figure 1:
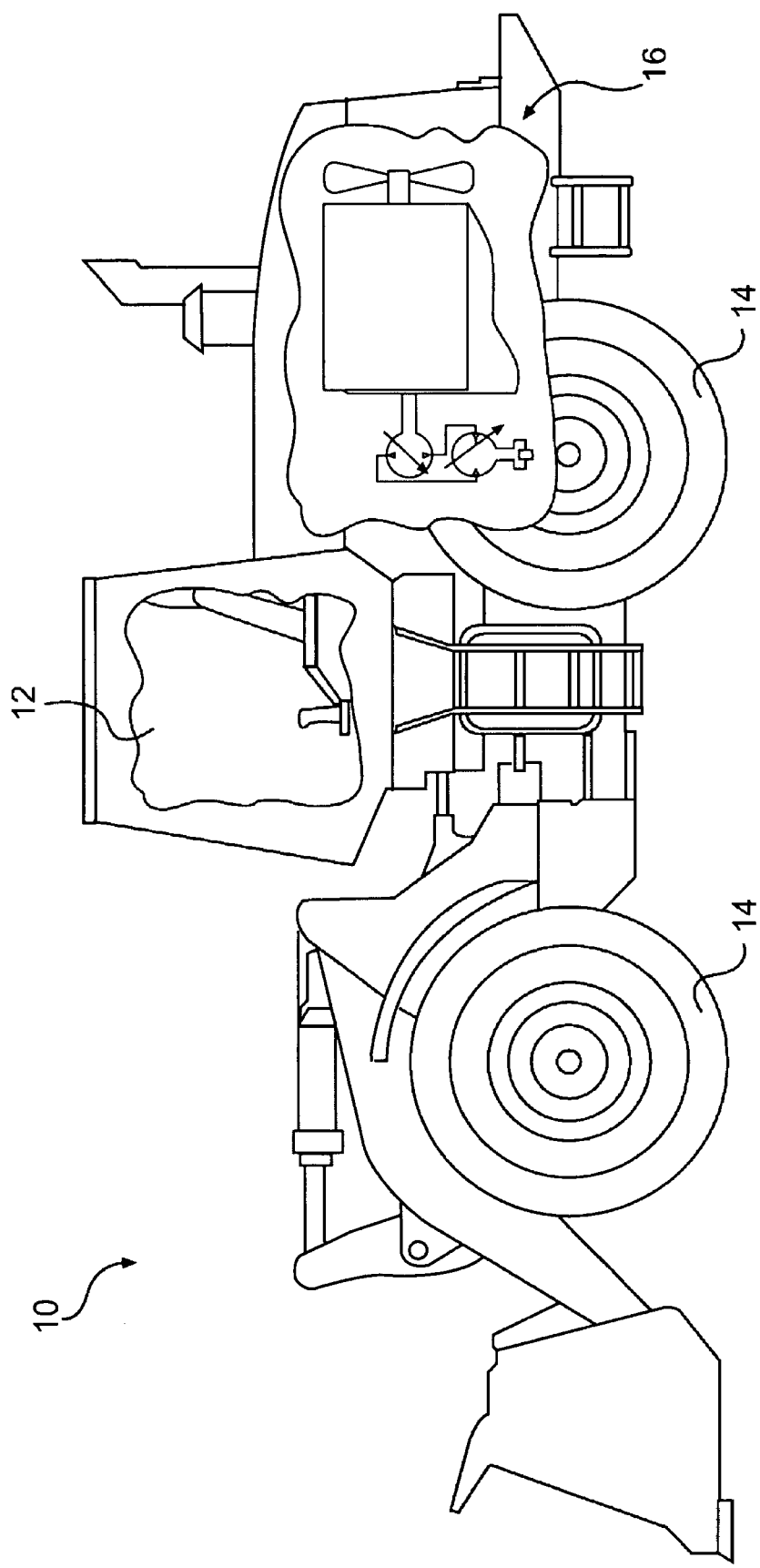
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, one or more traction devices 14, and a power train 16 operatively connected to drive at least one of traction devices 14.

Figure 2:
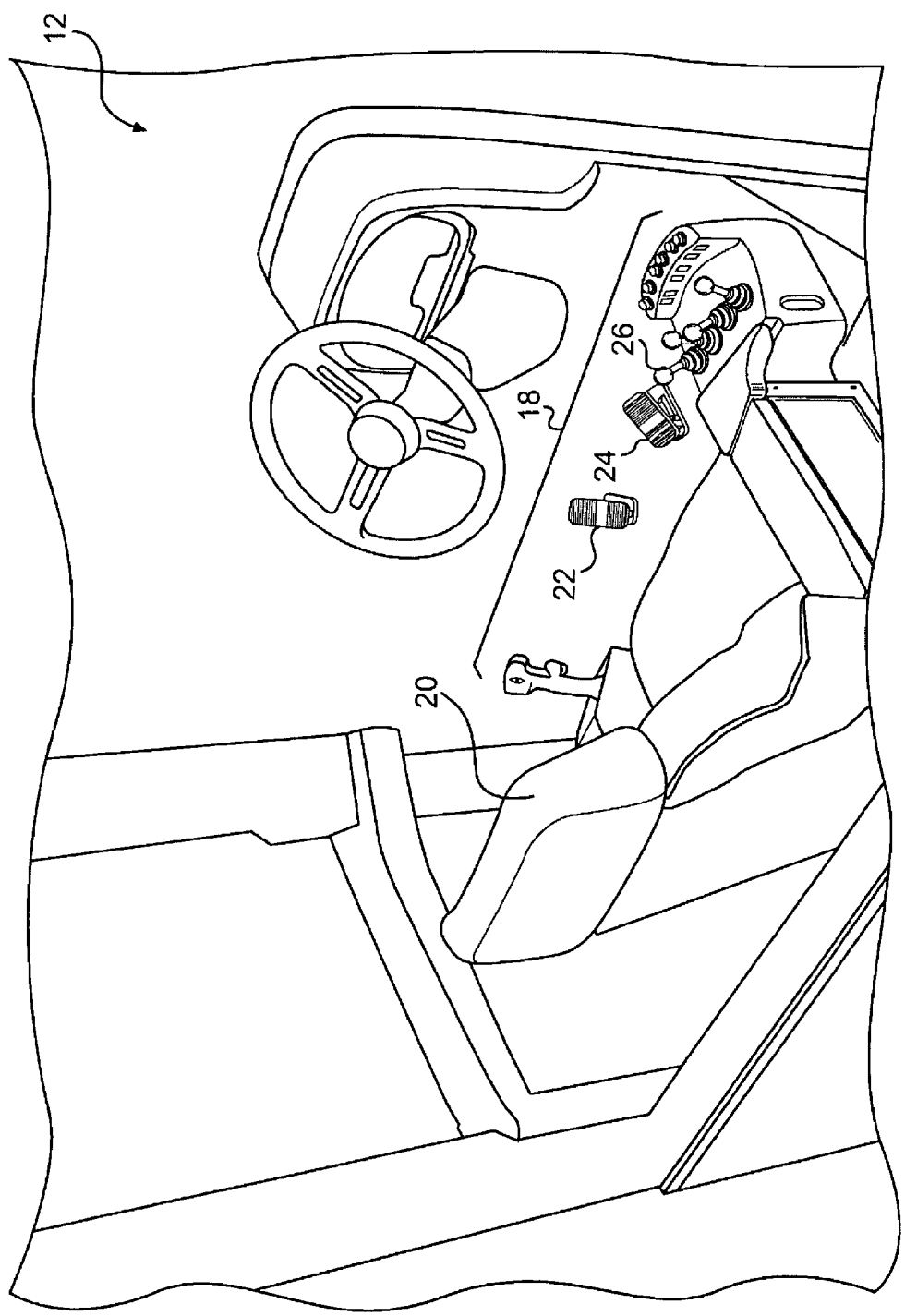
FIG. 2 is a pictorial illustration of an exemplary disclosed operator station for use with the machine of FIG. 1.

As illustrated in FIG. 2, operator station 12 may include devices that receive input from a machine operator indicative of a desired machine travel maneuver. Specifically, operator station 12 may include one or more operator interface devices 18 located proximate an operator seat 20. Operator interface devices 18 may initiate movement of machine 10 by producing signals that are indicative of a desired machine maneuver. In one embodiment, operator interface devices 18 may include a left foot pedal 22 and a right foot pedal 24. As an operator manipulates left foot pedal 22 and/or right foot pedal 24 (i.e., displaces left and/or right foot pedals 22 and 24 away from a neutral position), the operator may expect and affect a corresponding machine travel movement. It is contemplated that operator interface devices other than foot pedals such as, for example, joysticks, levers, switches, knobs, wheels, and other devices known in the art, may additionally or alternatively be provided within operator station 12 for travel control of machine 10, if desired.

Traction devices 14 (referring to FIG. 1) may embody wheels located on each side of machine 10 (only one side shown). Alternatively, traction devices 14 may include tracks, belts or other known traction devices. It is contemplated that any combination of the wheels on machine 10 may be driven and/or steered.

Figure 3:
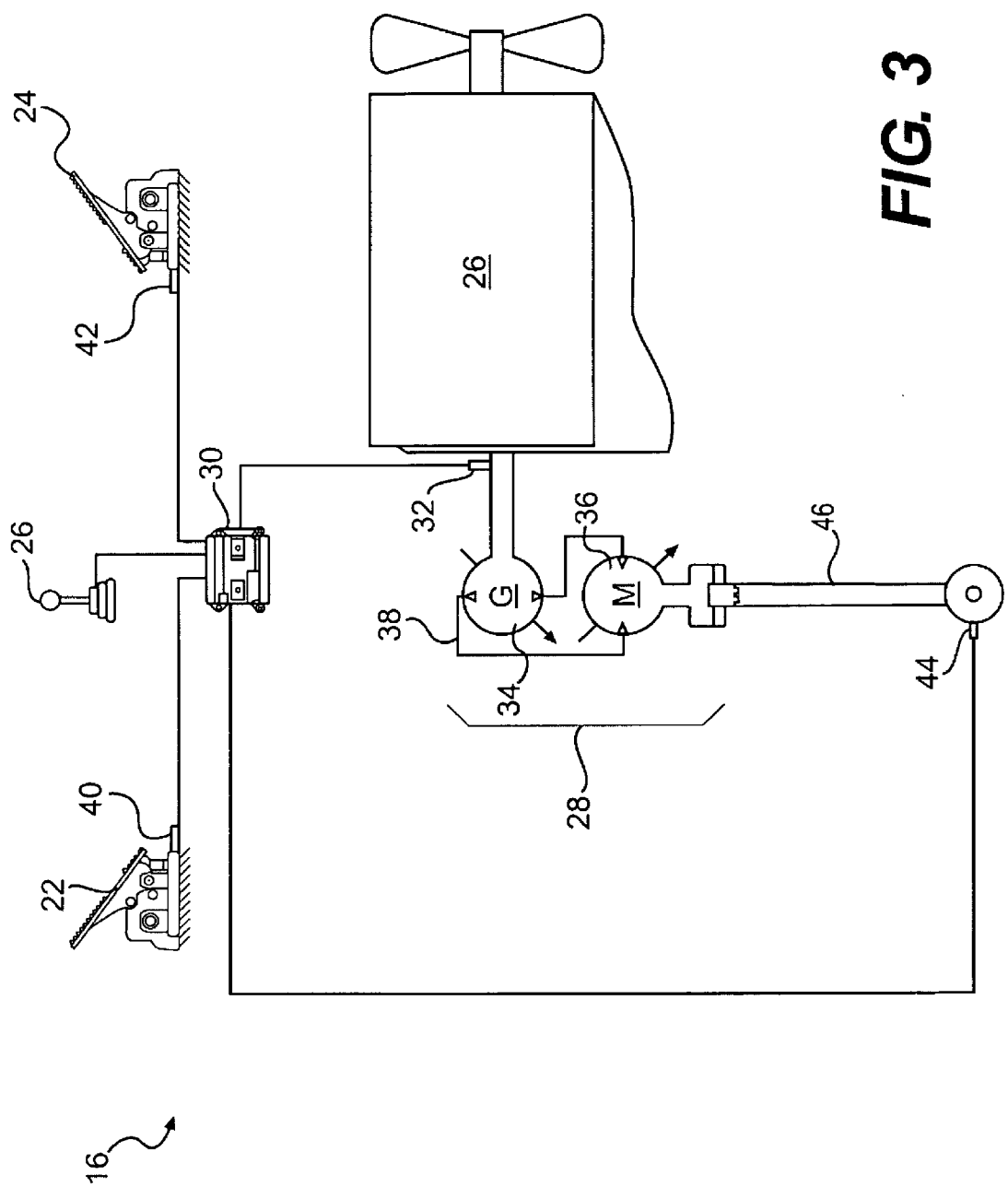
FIG. 3 is a diagrammatic illustration of an exemplary disclosed power train of the machine of FIG. 1.

As illustrated in FIG. 3, power train 16 may be an integral package configured to generate and transmit power to traction devices 14. In particular, power train 16 may include a power source 26 operable to generate a power output, a transmission 28 connected to receive the power output and transmit the power output in a useful manner to traction devices 14 (referring to FIG. 1), and a control module 30 configured to regulate the operation of power source 26 and transmission 28 in response to one or more inputs.

Power source 26 may include an internal combustion engine having multiple subsystems that cooperate to produce mechanical or electrical power output. For the purposes of this disclosure, power source 26 is depicted and described as a four-stroke diesel engine. One skilled in the art will recognize, however, that power source 26 may be any other type of internal combustion engine such as, for example, a gasoline or a gaseous fuel-powered engine. The subsystems included within power source 26 may include, for example, a fuel system, an air induction system, an exhaust system, a lubrication system, a cooling system, or any other appropriate system.

A sensor 32 may be associated with power source 26 to sense an output speed thereof. In one example, sensor 32 may embody a magnetic pickup type of sensor associated with a magnet embedded within a rotational component of power train 16 such as a crankshaft or flywheel. During operation of power source 26, sensor 32 may sense the rotating magnetic field produced by the magnet and generate a signal corresponding to the rotational speed of power source 26.

Transmission 28 may embody, for example, a continuously variable transmission (CVT). Transmission 28 may be any type of continuously variable transmission such as, for example, a hydraulic CVT, a hydro-mechanical CVT, an electric CVT, or other configuration as would be apparent to one skilled in the art. In addition, transmission 28 may include a driving element 34 and a driven element 36.

In the exemplary electric CVT of FIG. 3, driving element 34 may be a generator, such as a three-phase permanent magnet alternating field-type generator, and driven element 36 may be an electric motor, such as permanent magnet alternating field-type motor configured to receive power from driving element 34. The generator of driving element 34 may be connected to drive the motor of driven element 36 with electric current via power electronics 38 in response to a torque command directed to driven element 36. In some situations, the motor of driven element 36 may alternatively drive the generator of driving element 34 in reverse direction via power electronics 38. It is contemplated that, in embodiments utilizing a hydraulic continuously variable transmission, driving element 34 may be a pump, such as a variable displacement pump, and driven element 36 may be a motor, such as a variable displacement motor. Driven element 36 may be fluidly connected to driving element 34 by conduits that supply and return fluid to and from driving element 34 and driven element 36, allowing driving element 34 to effectively drive driven element 36 by fluid pressure.

Power electronics 38 may include generator associated components and motor associated components. For example, power electronics 38 may include one or more drive inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating driving element 34 and driven element 36. Other components that may be associated with the drive inverter include power supply circuitry, signal conditioning circuitry, and solenoid driver circuitry, among others. In addition, power electronics 38 may include a generator heat sink (not shown), and a motor heat sink (not shown) in communication with driving element 34 and driven element 36, respectively. Each heat sink may absorb heat from their respective components of power electronics 38 and transfer this heat to a cooling system (not shown)

Transmission 28 may be at least partially controlled with left and right foot pedals 22 and 24. That is, as left and right foot pedals 22 and 24 are manipulated by an operator, the foot pedals may provide electric signals signifying a desired driven element output such as, for example, a desired torque output and/or a desired speed limit. For example, left and right foot pedals 22 and 24 may have a minimum position and be movable through a range of positions to a maximum position. Sensors 40 and 42 may be provided in association with each of left and right foot pedals 22 and 24, respectively, to sense the displacement positions thereof and produce corresponding signals responsive to the displaced positions. Sensors 40 and 42 may be any sensor capable of sensing the displacement of foot pedals 40 and 42 such as, for example, a switch or potentiometer. The displacement signals from each of sensors 40 and 42 may be directed through control module 30 to transmission 28 to control the torque output of driven element 36.

A sensor 44 may be associated with transmission 28 and/or traction device 14 (referring to FIG. 1) to sense a travel speed of machine 10. In one example, sensor 44 may embody a magnetic pickup type of sensor associated with a magnet embedded within a rotational component of power train 16 such as a transmission output shaft 46. During operation of machine 10, sensor 44 may sense the rotating magnetic field produced by the magnet and generate a signal corresponding to the rotational speed of transmission 28 and/or the corresponding travel speed of machine 10.

Control module 30 may embody a single microprocessor or multiple microprocessors for controlling the operation of power train 16 in response to received signals. Numerous commercially available microprocessors can be configured to perform the functions of control module 30. It should be appreciated that control module 30 could readily embody a general machine microprocessor capable of controlling numerous machine functions. Control module 30 may include a memory, a secondary storage device, a processor, and any other components for running an application. Various other circuits may be associated with control module 30 such as power supply circuitry, signal conditioning circuitry, solenoid driver circuitry, and other types of circuitry.

Figure 4:
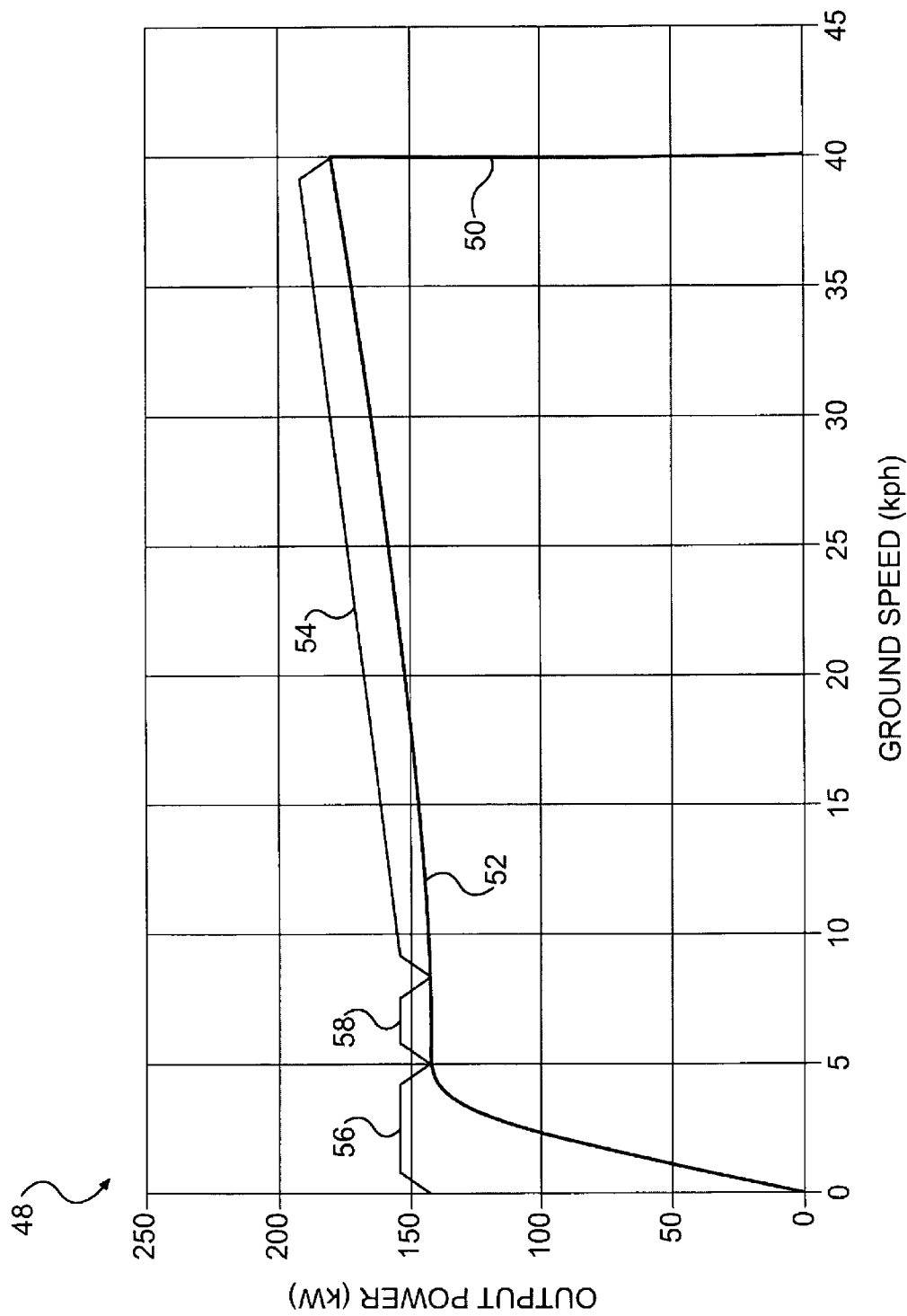
FIG. 4 is an exemplary disclosed control map for use with a control system of the power train of FIG. 3.

FIG. 4 illustrates an exemplary control map 48 stored in the memory of control module 30 for regulating a power output of power train 16 in response to a power output request. Control module 30 may reference control map 48 in response to input from the operator such as, for example, a signal indicating an actuation of right pedal 24, a signal indicating an actuation of left pedal 22, or any other signal indicating an actuation of an operator interface device 18 initiating a request for a power output. Control map 48 may include an x-axis representing a ground speed of machine 10 and a y-axis representing a power output of power train 16. In addition, control map 48 may include a ground speed limit 50 and a power output limit 52.

Ground speed limit 50 may be the ground speed of machine 10 that may be generated when the power output of drive train 16 is at a maximum. This maximum power output may be achieved by employing a maximum transmission ratio and operating power source 26 at a maximum power generating speed. It should be understood that ground speed limit 50 may not be the maximum ground speed power train 16 may be capable of generating. It is contemplated that control module 30 may permit the ground speed of machine 10 to exceed ground speed limit 50 in applications requiring a maximum speed instead of a maximum power output. In order to maintain the ground speed of machine 10 at or below ground speed limit 50, any number of devices or algorithms designed to regulate the speed of power source 26 and/or the transmission ratio of transmission 28 may be employed.

Power output limit 52 may be the maximum power output that power train 16 may be permitted to generate for any given ground speed of machine 10. When referencing control map 48, control module 30 may regulate the power source speed and/or the transmission ratio of transmission 28 so that the power output of power train 16 may not exceed power output limit 52. As is illustrated in FIG. 4, power output limit 52 may increase as the ground speed of machine 10 increases and may be divided into a gradual increase portion 54, a rapid increase portion 56, and a transition portion 58 occurring between gradual increase portion 54 and rapid increase portion 56.

Gradual increase portion 54 of power output limit 52 may govern a maximum power output of power train 16 for ground speeds at which rolling resistance and internal friction experienced in the wheels and axles of traction devices 14 may have a greater than minimal effect on the performance of power train 16. In particular, gradual increase portion 54 may begin at a ground speed at which the rolling resistance and internal friction may begin to have a greater than minimal effect on the performance of power train 16 and may terminate at a ground speed substantially the same as ground speed limit 50. Control module 30 may increase power output limit 52 at a rate proportional to a rate of increase of the rolling resistance and internal friction. For example, if the rolling resistance and internal friction increase linearly with ground speed, the maximum power output at gradual increase portion 54 may be represented by a linear equation according to Eq. 1 below:

$$y = \left(\frac{y_{\max} - b}{x_{\max}}\right)x + b \qquad \text{Eq. 1}$$

where y is the power output at a particular ground speed, $y_{max}$ is the maximum power output that power train 16 may generate when machine 10 is traveling at a ground speed substantially the same as ground speed limit 50, $x_{max}$ is ground speed limit 50, x is the ground speed at which machine 10 is currently traveling, y is the maximum power output that power train 16 may be permitted to generate at ground speed x, and b is the maximum power output that would be permitted if gradual increase portion were to be extended to a ground speed of approximately zero. Alternatively, it is contemplated that the rate of increase of power output limit 52 may be based on other factors in addition to or instead of the rate of increase of the rolling resistance and internal friction.

Rapid increase portion 56 of power output limit 52 may govern a maximum power output of power train 16 for at least a portion of ground speeds at which the rolling resistance and internal friction may have a minimal effect on the performance of power train 16. Unlike the power output restriction placed on power train 16 at gradual increase portion 54, rapid increase portion 56 may permit power train 16 to generate the maximum power possible for the ground speed at which machine 10 may be traveling. In addition, rapid increase portion 56 may begin at a ground speed of approximately zero and may terminate at an initial ground speed at which power train 16 may be capable of generating a power output substantially the same as the maximum power output at the beginning of gradual increase portion 54. For example, in the exemplary control map 48 illustrated in FIG. 4, $y_{max}$ may be approximately 175 kW, $x_{max}$ may be approximately 40 kph, and b may be approximately 130 kW. If the ground speed at which the rolling resistance and internal friction may begin to have a greater than minimal effect on the performance of power train 16 may be 8 kph, the maximum permitted power output at the beginning of gradual increase portion 54 may be calculated to be approximately 137 kW. Therefore, rapid increase portion 56 may terminate at the first ground speed at which power train 16 may generate a maximum power output of 137 kW. For example, the initial ground speed at which power train 16 may be capable of generating approximately 137 kW may be approximately 5 kph.

Transition portion 58 of power output limit 52 may govern a maximum power output of power train 16 for ground speeds occurring between the termination of rapid increase portion 56 and the beginning of gradual increase portion 54. When referencing transition portion 58, power output limit 56 may remain substantially the same. That is, the magnitude of power output limit 52 at the beginning of transition portion 58 may be substantially the same as the magnitude of power output limit 52 at the termination of transition portion 58.

Figure 5:
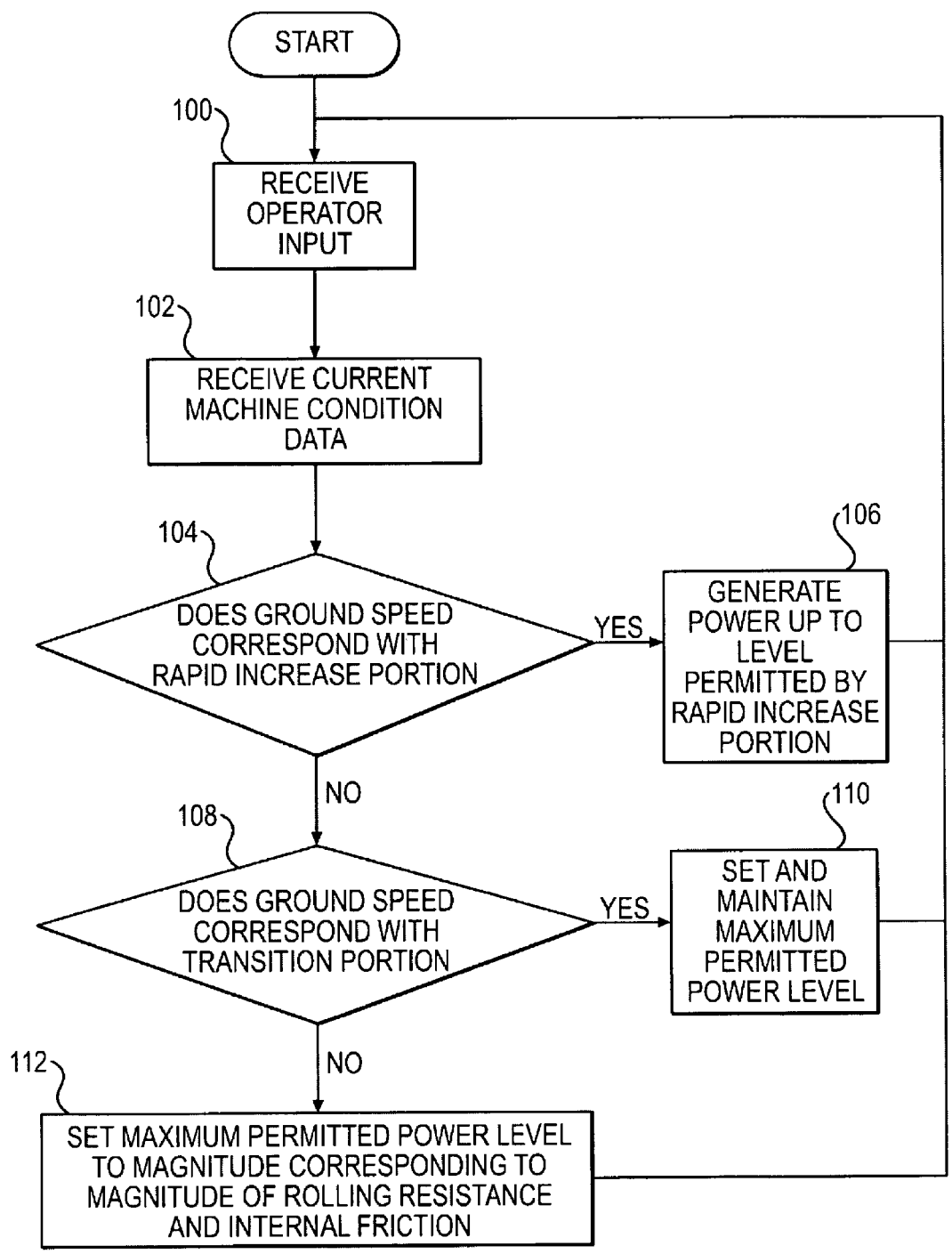
FIG. 5 is a flow chart depicting an exemplary method for operating the power train of FIG. 3.

FIG. 5 illustrates an exemplary method for controlling power system 16. In particular, FIG. 5 is a flow chart representing an exemplary method for regulating the power output of power train 16 as the ground speed of machine 10 increases. FIG. 5 will be discussed further in the following section to better illustrate the disclosed system and its operation.

INDUSTRIAL APPLICABILITY

The disclosed control system may adequately operate a vehicle at travel speeds that generate a rolling resistance and internal friction in the wheel and axle. In addition, the disclosed control system may be able to adequately operate a vehicle at higher travel speeds when encountering external resistance such as, for example, a hill. In particular, the disclosed control system may restrict the power output and maximum speed of the vehicle so that the power train may generate a maximum power output at the vehicle's top speed. The operation of power train 16 will be described below.

As illustrated in FIG. 5, the method may begin when control module 30 receives signals from an actuated operator interface device 18 requesting an increase in power output from power train 16 (step 100). Such signals may be received from sensor 40 indicating an actuation of left pedal 22, sensor 42 indicating an actuation of right pedal 24, or any other source indicating an actuation of an operator interface device 18 initiating a request for a power output. After receiving a signal indicating an operator request for power, control module 30 may receive current machine condition data from sensors 32 and 44 (step 102). Such data may include, for example, current power source speed and a current ground speed of machine 10.

After receiving the current machine condition data, control module 30 may determine if the current ground speed of machine 10 may correspond to rapid increase portion 56 of output power limit 52 (step 104). For example, ground speeds at or below an initial ground speed at which power train 16 may be capable of generating a maximum power substantially the same as the lowest maximum power output permitted for gradual increase portion 54 may correspond to rapid increase portion 56. In the exemplary control map 48 (referring to FIG.

4), the lowest maximum power output permitted for gradual increase portion 54 may be approximately 130 kW. The initial ground speed at which power train 16 may be capable of generating 130 kW of power may be at approximately 5 kph. Therefore, any speed at or below approximately 5 kph may correspond to rapid increase portion 56. If control module 30 determines that the current ground speed of machine 10 corresponds to rapid increase portion 56 (step 104: Yes), control module 30 may permit power train 16 to generate any magnitude of power requested by the operator up to the maximum power possible for the ground speed at which machine 10 may be traveling (step 106). After generating the power requested, step 100 may be repeated (i.e., control module 30 may receive signals from an actuated operator interface device 18 requesting an increase in power output from power train 16).

If control module 30 determines that the current ground speed of machine 10 does not correspond to rapid increase portion 56 (step 104: No), control module 30 may determine if the current ground speed of machine 10 may correspond to transition portion 58 (step 108). For example, ground speeds between the maximum speed for rapid increase portion 56 and the ground speed at which rolling resistance and internal friction experienced in the wheels and axles of traction devices 14 may begin to have a greater than minimal effect on the performance of power train 16. In the exemplary control map 48 (referring to FIG. 4), the ground speed at which rolling resistance and internal friction may begin to have a greater than minimal effect on the performance of power train 16 may be approximately 8 kph. Therefore, ground speeds between approximately 5 kph and 8 kph may correspond to transition portion 58.

If control module 30 determines that the current ground speed of machine 10 corresponds to transition portion 58 (step 108: Yes), control module 30 may set and maintain the maximum power that power train 16 may be permitted to generate at a level approximately the same as the maximum possible power that may be generated in rapid increase portion 56 (step 110). In the exemplary control map 48 (referring to FIG. 4), the maximum possible power that may be generated in rapid increase portion 56 may be approximately 130 kW. Therefore, when the current ground speed corresponds to transition portion 58, control module 30 may set and maintain the maximum permitted power that power train 16 may generate to approximately 130 kW. After setting and maintaining the maximum permitted power level, step 100 may be repeated (i.e., control module 30 may receive signals from an actuated operator interface device 18 requesting an increase in power output from power train 16).

If control module 30 determines that the current ground speed of machine 10 does not correspond to transition portion 58 (step 108: No), the current ground speed may correspond to gradual increase portion 54. Control module 30 may set the maximum power that power train 16 may be permitted to generate according to an algorithm corresponding to the magnitude of rolling resistance and internal friction and may limit the maximum ground speed to the speed at which power train 16 may generate its maximum power (step 112). For example, if rolling resistance and internal friction may increase proportionally to the ground speed of machine 10, the maximum permitted power may be set to also increase proportionally to the ground speed of machine 10. Furthermore, in the exemplary control map 48 (referring to FIG. 4), the maximum possible power that may be generated by power train 16 may be approximately 175 kW. Such a magnitude of power may be generated when machine 10 may be traveling at approximately 40 kph. Therefore, control module 30 may limit the maximum ground speed of machine 10 to approximately 40 kph. After setting the maximum permitted power level according to the algorithm corresponding to the magnitude of rolling resistance and internal friction and limiting the maximum ground speed of machine 10, step 100 may be repeated (i.e., control module 30 may receive signals from an actuated operator interface device 18 requesting an increase in power output from power train 16).

Because the disclosed control system may limit the magnitude of power generated by the power train for ground speeds below a maximum ground speed, the performance of the power train at higher speeds may be improved. In particular, limiting the amount of power generated by the power train so that the maximum power output may increase as the ground speed increases may permit the power train to overcome rolling resistance and internal frictional losses experienced at higher speeds.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power train, comprising:
a power source operably coupled to a transmission to transmit a power output to at least one traction device; and
a controller configured to:
regulate the power output so that the power output generated when the at least one traction device is moving at a ground speed limit is a power output limit for the power source and the transmission,
set the ground speed limit of the at least one traction device to a speed limited by the power output limit for the power source and the transmission, and
limit the power output based on a ground speed of the at least one traction device.

2. The power train of claim 1, wherein the controller is configured to increase the limit on the power output as the speed of the at least one traction device increases.

3. The power train of claim 2, wherein the controller is configured to increase the limit on the power output as a rolling resistance and/or internal friction experienced by the at least one traction device increases.

4. The power train of claim 3, wherein the controller is configured to permit the power source and the transmission to generate power output at the limit when the rolling resistance and/or internal friction have a minimal effect on the performance of the power train.

5. The power train of claim 4, wherein the controller is configured to limit the power output of the power source and the transmission when the rolling resistance and/or internal friction have a minimal effect on the performance of the power train, and the limit on the power output of the power source and the transmission is exceeded by a minimum limit on the power output imposed when the rolling resistance and/or internal friction have a greater than minimal effect on the performance of the power train.

6. A method of operating a power train, comprising:
sensing a first parameter indicative of a speed of a power source of a machine;
sensing a second parameter indicative of an operating condition of a transmission of the machine;
sensing a third parameter indicative of a ground speed of the machine;

regulating power output of the power source and the transmission so that a power output generated when the machine is moving at a ground speed limit is a power output limit for the power source and the transmission;

setting the ground speed limit to a speed limited by the power output limit for the power source and the transmission; and limiting the power output based on the ground speed of the machine.

7. The method of claim 6, further including increasing the limit on the power output as the ground speed of the machine increases.

8. The method of claim 7, further including increasing the limit on the power output based on a rolling resistance and/or internal friction that have more than a minimal effect on performance of the power source and the transmission.

9. The method of claim 8, further including increasing the limit on the power output as the rolling resistance and/or internal friction increases.

10. The method of claim 9, further including permitting the power source and the transmission to generate power output at the limit when the rolling resistance and/or internal friction have a minimal effect on the performance of the power source and the transmission.

11. A machine, comprising:
   at least one traction device;
   a power source and a transmission configured to generate a power output;
   a transmission output shaft configured to transmit the power output to the at least one traction device; and
   a controller configured to:
      regulate the power output so that the power output generated when the machine is traveling at a ground speed limit is a power output limit for the power source and the transmission,
      set the ground speed limit of the machine at a speed limited by the power output limit for the power source and the transmission, and
      limit the power output based on the ground speed of the machine.

12. The machine of claim 11, wherein the controller is configured to increase the limit on the power output as the ground speed of the machine increases.

13. The machine of claim 12, wherein the controller is configured to increase the limit on the power output as a rolling resistance and/or internal friction experienced by the at least one traction device increases.

14. The machine of claim 13, wherein the controller is configured to permit the power source and the transmission to generate power output at the limit when the rolling resistance and internal friction have a minimal effect on performance of the power source and the transmission.

15. The machine of claim 14, wherein the controller is configured to limit the power output of the power source and the transmission when the rolling resistance and/or internal friction have a minimal effect on the performance of the power source and the transmission and the limit on the power output is exceeded by a minimum limit on the power output imposed when the rolling resistance and/or internal friction have a minimal effect on the performance of the power source and the transmission.

* * * * *